(No Model.)
G. L. RICHARDSON.
BEARING FOR TURBINE WHEELS.
No. 413,208. Patented Oct. 22, 1889.
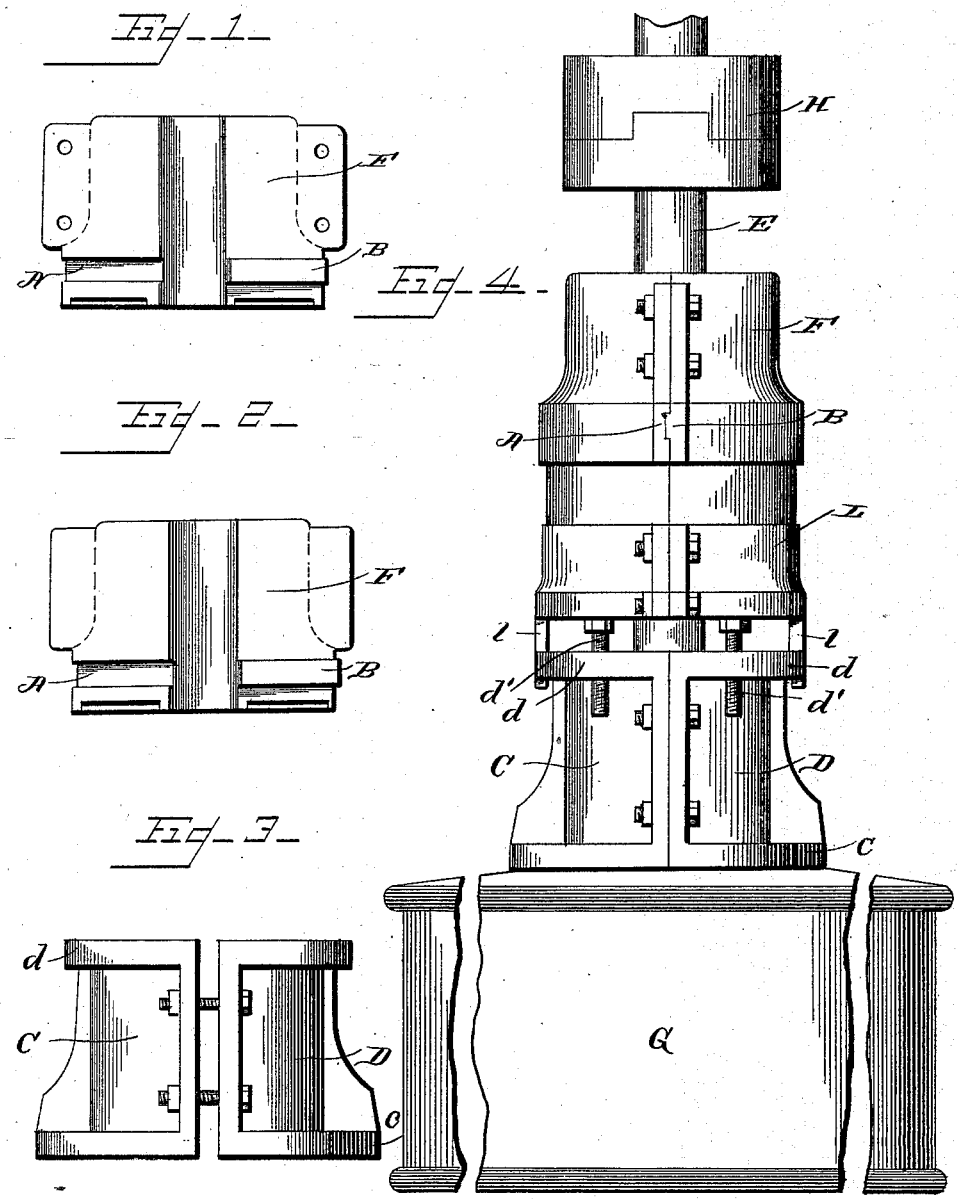

UNITED STATES PATENT OFFICE.

GEORGE LINCOLN RICHARDSON, OF BRUNSWICK, MAINE.

BEARING FOR TURBINE WHEELS.

SPECIFICATION forming part of Letters Patent No. 413,208, dated October 22, 1889.

Application filed April 13, 1889. Serial No. 307,079. (No model.)

*To all whom it may concern:*

Be it known that I, GEORGE LINCOLN RICHARDSON, a citizen of the United States, residing at Brunswick, in the county of Cumberland and State of Maine, have invented a new and useful Bearing for Turbine Water-Wheels, of which the following is a specification.

My invention relates to bearings for turbine water-wheels, and is designed as an improvement on the bearing illustrated and described in Letters Patent No. 391,918, granted to me October 30, 1888, and to which reference should be had.

The object of the present invention is to facilitate the application of my improved bearing to turbine water-wheels and to remove the parts that may become worn and substitute others in their place without the necessity of removing gears and couplings from the shaft.

To these ends my invention consists in the peculiar construction and combinations of parts hereinafter fully set forth, and particularly pointed out in the claims.

In the drawings, Figures 1 and 2 represent two opposite sections or parts of a bearing. Fig. 3 is an elevation of a stand, and Fig. 4 is an elevation of the bearing and stand applied to the shaft of a water-wheel.

In the patent above referred to the bearing designed to support the weight of the water-wheel is an integral wooden collar surrounding the shaft and resting on a metal collar made in sections adapted to be bolted together around the shaft. This latter collar is adjustable vertically by means of screws working in a flange at the upper end of a cylindrical tube leading from the wheel-casing. After the wooden collar becomes too much worn it has to be replaced by a new one, and that necessitates removing gears and couplings, thereby consuming much time. I therefore propose to use a collar F, made in sections, as shown in Figs. 1 and 2, and designed to fit rigidly around the shaft E, the sections being secured together by bolts.

In order to prevent the two sections from having any movement on each other when surrounding the shaft, I provide each with a channel or groove A on one side of the recess for the shaft, and a key or projection B on the opposite side, so that when bolted together around the shaft the key of one section will fit in the groove or channel of the other section.

The vertically-adjustable collar L, made in sections, and on which the collar F rests, is of substantially the same construction as shown in the patent referred to, and is provided with depending lugs or ears *l*.

Instead of providing the cylindrical tube, which extends upward from the wheel-casing, with a flange, I use a stand made of two sections C D, adapted when bolted together to surround the shaft E and rest on the wheel-casing, it being provided with a flange *c* at its lower end to form a wide base area. The stand is provided at its upper end with a flange *d*, in which are threaded holes to receive the adjusting-screws *d'*. The flange *d* is also provided with recesses with which the depending lugs *l* engage.

G represents the wheel-casing, and H a coupling-section rigidly secured to the shaft E.

The advantages of this construction and combination of parts will be readily seen. The bearing can easily be replaced when it becomes too much worn, as the weight of the wheel can be supported on the lower end of the shaft while the bearing is being removed, and no gear or coupling need be disturbed. By means of the stand I am enabled to apply my improved bearing to turbine water-wheels whose casing may not have a vertical cylindrical tube surrounding the shaft and provided with a flange at its upper end.

In some wheels the coupling on end of shaft may be ten feet from case of wheel. The collar F, Figs. 1 and 2, is designed to clamp rigidly around the wheel-shaft, and by means of set-screws to hold the weight of the wheel without having any connection with the coupling.

Having described my invention, I claim—

1. The combination of the wheel-casing, the wheel-shaft, a sectional collar F, surrounding said shaft, an adjustable collar L, and a supporting-stand for the adjustable collar, substantially as described.

2. The combination, with the wheel-casing, the wheel-shaft, and the coupling rigidly secured to said shaft, of a supporting-stand made in sections adapted to be bolted together around the shaft, said stand resting on the wheel-casing, collars surrounding said shaft, and screws working in the stand and engaging one of said collars to give it vertical adjustment, as set forth.

3. As a bearing for turbine water-wheels, a collar F, made in sections provided with interlocking devices and adapted to be bolted together around the wheel-shaft, combined with the wheel-casing, the wheel-shaft, and a supporting-stand bearing on the wheel-casing and interposed between the collar and the wheel-casing, substantially as described.

4. The combination, with the wheel-casing, the wheel-shaft, and the coupling rigidly secured to the upper end of said shaft, of a stand made in sections adapted to be bolted together around the shaft, said stand having a flange at its lower end adapted to rest on the wheel-casing, and having also a flange at its upper end provided with threaded holes, screws working in said holes, a metal collar surrounding said shaft and being vertically adjustable by means of said screws, and a sectional wooden collar supported by said metal collar, substantially as set forth.

In testimony that I claim the foregoing as my own I have hereto affixed my signature in presence of two witnesses.

GEORGE LINCOLN RICHARDSON.

Witnesses:
SAMUEL B. DUNNING,
JOHN H. RICHARDSON.